(12) United States Patent
Lee et al.

(10) Patent No.: US 8,556,281 B2
(45) Date of Patent: Oct. 15, 2013

(54) BRACKET FOR MOUNTING SHOCK ABSORBER

(75) Inventors: Yoon Hyun Lee, Jeollabuk-do (KR); Myung Hwa Hyun, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 262 days.

(21) Appl. No.: 12/615,993

(22) Filed: Nov. 10, 2009

(65) Prior Publication Data
US 2010/0117325 A1    May 13, 2010

(30) Foreign Application Priority Data
Nov. 13, 2008    (KR) .................. 10-2008-0112606

(51) Int. Cl.
*F16F 9/54*    (2006.01)

(52) U.S. Cl.
USPC ............. 280/124.155; 280/124.147; 267/220; 188/321.11

(58) Field of Classification Search
USPC .................... 280/124.147, 124.155; 267/220; 403/203, 220–228; 188/321.11; 384/296, 428, 438
See application file for complete search history.

(56) References Cited

U.S. PATENT DOCUMENTS

| | | | |
|---|---|---|---|
| 3,236,549 A * | 2/1966 | Phinney ...................... 403/162 |
| 4,088,357 A * | 5/1978 | Klie et al. ..................... 293/122 |
| 4,462,608 A * | 7/1984 | Lederman .............. 280/124.155 |
| 4,642,853 A * | 2/1987 | Plesniarski et al. ......... 24/163 R |
| 4,721,325 A * | 1/1988 | Mackovjak et al. ... 280/124.155 |
| 5,308,048 A * | 5/1994 | Weaver et al. ................ 267/220 |
| 5,308,104 A * | 5/1994 | Charles .................. 280/124.155 |
| 5,454,585 A * | 10/1995 | Dronen et al. ......... 280/124.145 |
| 5,467,971 A * | 11/1995 | Hurtubise et al. ............ 267/220 |
| 5,788,262 A * | 8/1998 | Dazy et al. ............ 280/124.155 |
| 6,182,953 B1 * | 2/2001 | Smith et al. ................... 267/220 |
| 6,394,436 B1 * | 5/2002 | Schnaars et al. .............. 267/220 |
| 6,412,798 B2 * | 7/2002 | De Fontenay et al. . 280/124.147 |
| 6,561,531 B2 * | 5/2003 | Kobayashi et al. .... 280/124.155 |
| 6,592,112 B2 * | 7/2003 | Bishop et al. ................. 267/220 |
| 6,733,023 B2 * | 5/2004 | Remmert et al. ...... 280/124.179 |
| 6,764,066 B2 * | 7/2004 | Graeve ......................... 267/220 |
| 6,843,352 B2 * | 1/2005 | Jacoby et al. ............ 188/321.11 |
| 6,857,626 B2 * | 2/2005 | Burlage et al. ................ 267/220 |

(Continued)

FOREIGN PATENT DOCUMENTS

| JP | 58063441 U | 4/1983 |
| JP | 62072203 U | 5/1987 |
| JP | 2004069020 A | 3/2004 |

OTHER PUBLICATIONS

San Diego Plastics, Nylon [online]. Wayback machine Internet Archive [retreived on Nov. 16, 1999]. Retrieved from the Internet<http://web.archive.org/web/19991116140816/http://www.sdplastics.com/nylon.html>.*

*Primary Examiner* — Joseph Rocca
*Assistant Examiner* — Barry Gooden, Jr.
(74) *Attorney, Agent, or Firm* — McDermott Will & Emery LLP (57) ABSTRACT

A bracket is provided to mount a shock absorber to a vehicle body. The bracket is configured to couple a distal end of a piston rod of the shock absorber to a vehicle body. The bracket is molded of a plastic material and includes a body having a recess formed thereon, the recess allowing a bush assembly to be inserted therein, and a flange extending from the body. The bracket is molded integrally with a metal insert.

7 Claims, 5 Drawing Sheets

(56) References Cited

U.S. PATENT DOCUMENTS

| | | | |
|---|---|---|---|
| 6,908,076 B2 * | 6/2005 | Hayashi et al. | 267/220 |
| 6,948,728 B2 * | 9/2005 | Pflügner et al. | 280/124.147 |
| 6,969,053 B2 * | 11/2005 | Kawada et al. | 267/292 |
| 7,281,705 B2 * | 10/2007 | Huprikar | 267/220 |
| 7,338,040 B2 * | 3/2008 | Schleck et al. | 267/220 |
| 7,347,414 B2 * | 3/2008 | Groves | 267/220 |
| 7,350,779 B2 * | 4/2008 | Tamura | 267/220 |
| 7,938,418 B1 * | 5/2011 | Coombs et al. | 280/124.147 |
| 2001/0015537 A1 * | 8/2001 | De Fontenay et al. | 280/124.155 |
| 2002/0109328 A1 * | 8/2002 | Remmert et al. | 280/124.147 |
| 2002/0145242 A1 | 10/2002 | Miyamoto et al. | |
| 2002/0163155 A1 * | 11/2002 | Kawada et al. | 280/124.155 |
| 2003/0025257 A1 * | 2/2003 | Handke | 267/220 |
| 2003/0189278 A1 * | 10/2003 | Kawada et al. | 267/292 |
| 2003/0234147 A1 | 12/2003 | Lun | |
| 2004/0104552 A1 * | 6/2004 | Nicot et al. | 280/124.155 |
| 2005/0029062 A1 * | 2/2005 | Dean et al. | 188/322.12 |
| 2010/0289242 A1 * | 11/2010 | Nitsche et al. | 280/124.155 |

\* cited by examiner

Prior Art

BRACKET FOR MOUNTING SHOCK ABSORBER

CROSS REFERENCE TO RELATED APPLICATION

This application claims priority from and the benefit of Korean Patent Application No. 10-2008-0112606, filed on Nov. 13, 2008, which is hereby incorporated by reference for all purposes as if fully set forth herein.

BACKGROUND

1. Technical Field

The present disclosure relates to a bracket for mounting a shock absorber to a vehicle body, and more particularly, to a bracket for mounting a shock absorber, which is made of an engineering plastic material.

2. Description of the Related Art

In general, a shock absorber is disposed between a vehicle body and a wheel, with an upper end of a piston rod secured to the vehicle body and a lower end of a cylinder (generally, referred to as an outer cylinder or tube) secured to a wheel side. To this end, the upper end of the piston rod is provided with an upper mounting structure which will be secured to the vehicle body, and the lower end of the cylinder is provided with a knuckle bracket which will be connected to an axle.

Figure 1:
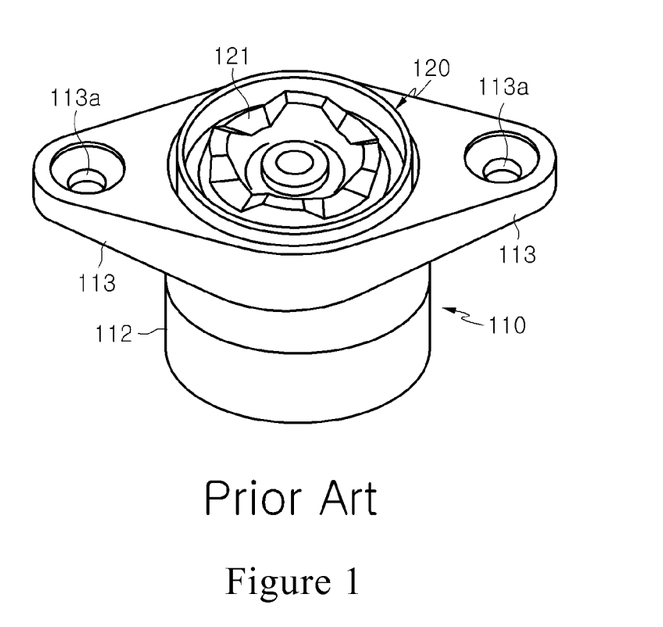
FIG. 1 is a perspective view of a bracket for mounting a shock absorber according to prior art.

As shown in FIG. 1, an upper mounting structure of a prior shock absorber includes a bracket 110 formed of steel or aluminum by a press machining process, a general machining process or an iron or aluminum-casting process and a bush assembly 120 press-fitted into the bracket 110 with the upper end of the piston rod coupled thereto.

A cylindrical recess is formed at a central portion of a body 112 of the bracket 110 such that the bush assembly 120 may be press-fitted in the cylindrical recess as described above, and bolt fastening holes 113a are respectively formed on flanges 113 extending from opposite sides of the body 112 of the bracket 110 such that bolts may be inserted into the bolt fastening holes for coupling the bracket to the vehicle body.

The cylindrical recess is formed at a center thereof with a through-hole through which the piston rod can pass, and the body 112 of the bracket 110 is formed at a lower side thereof with a mounting portion on which a dust cover and a bumper stopper are mounted.

The bush assembly 120 includes a rubber 121 for preventing vibration of the wheel transmitted through the piston rod from being transmitted to the vehicle body, a plate embedded in the rubber 121, a washer and a nut for coupling the upper end of the piston rod to the plate, and a pipe member attached to an outer periphery of the rubber 121.

The pipe member has a cylindrical shape and is sized such that the bush assembly 120 can be press-fitted into the recess of the bracket 110, thereby preventing the bush assembly 120 from being separated from the bracket 110.

On the other hand, in the upper mounting structure of the conventional shock absorber described above, the bracket 110 has been formed by steel pressing, casting or aluminum injection molding. Here, the steel pressing or casting of the bracket 110 causes many restrictions in shape and size of the bracket and results in an excessively heavy weight of the bracket. The aluminum injection molding of the bracket can produce a bracket with relatively light weight, but requires considerable material and machining costs.

BRIEF SUMMARY

According to one embodiment, a bracket is provided for mounting a shock absorber, which is formed of plastics to reduce material and machining costs while enabling easy manufacture and handling of the bracket, and has a metal insert, together with which the plastic bracket is molded to be reinforced.

According to an aspect, there is provided a bracket for mounting a shock absorber used for coupling a distal end of a piston rod of the shock absorber to a vehicle body, wherein the bracket is molded of a plastic material such that the bracket comprises a body having a recess formed thereon, the recess allowing a bush assembly to be inserted therein, and a flange extending from the body; and the bracket is molded integrally with a metal insert.

In one embodiment, the metal insert is formed at a center thereof with an opening corresponding to the recess of the body and is formed at both sides thereof with bolt fastening holes corresponding to bolt fastening holes formed on the flange, whereby the metal insert has a shape corresponding to a horizontally cross-sectional shape of the bracket.

In one embodiment, the metal insert consists of plate-, circle-, or washer-shaped inserts placed on both portions of the flange of the bracket, respectively, wherein each plate-, circle-, or washer-shaped insert is formed with an opening corresponding to the bolt fastening holes formed on the flange.

The metal insert is preferably formed within the flange in a sandwich manner.

The metal insert is preferably formed on at least one of upper and lower surfaces of the flange to be exposed to the outside or within the flange.

The body and the flange of the bracket are preferably made of a material containing one selected from PPS, PPA, PA612 and PA12 having low saturated water absorptivity for enhancing a waterproof property and a reinforcing material for increasing the strength.

DETAILED DESCRIPTION

Hereinafter, brackets for mounting a shock absorber according to preferred embodiments of the invention will be described with reference to an accompanying drawings in FIGS. 2-8.

Generally, a shock absorber is disposed between a vehicle body and a wheel, with an upper end of a piston rod secured to the vehicle body and a lower end of a cylinder secured to a wheel side. To this end, the upper end of the piston rod is provided with an upper mounting structure which will be secured to the vehicle body, and the lower end of the cylinder is provided with a knuckle bracket which will be connected to the axle.

The upper mounting structure of the shock absorber includes a bracket for mounting a shock absorber, a bush assembly, and the like. The piston rod of the shock absorber can be connected to the vehicle body via the bracket.

Figure 3:
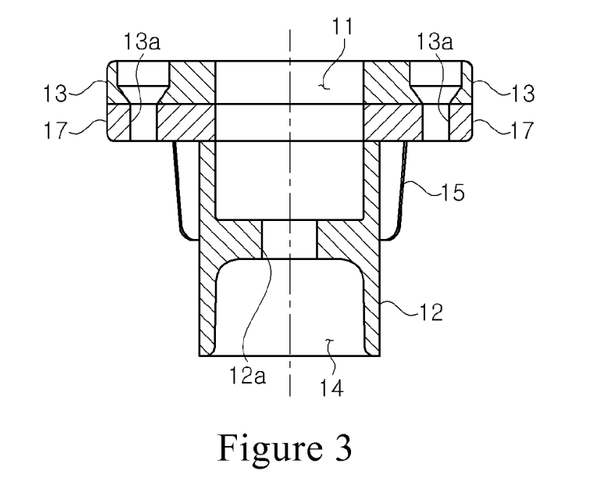
FIG. 3 is a cross-sectional view of a bracket configured to mount a shock absorber according to one embodiment.
Figure 4:
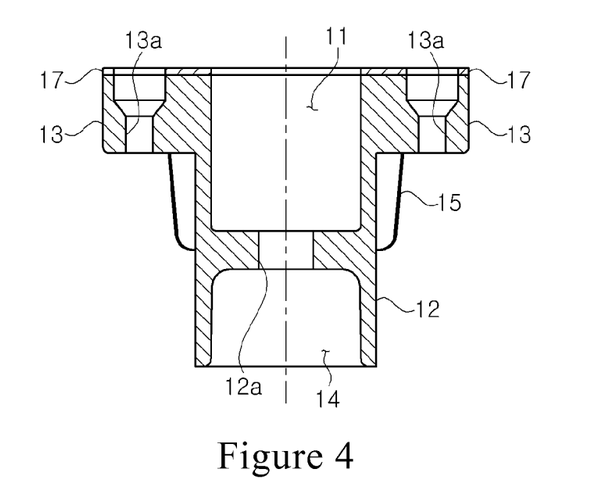
FIG. 4 is a cross-sectional view of a bracket configured to mount a shock absorber according to one embodiment.
Figure 5:
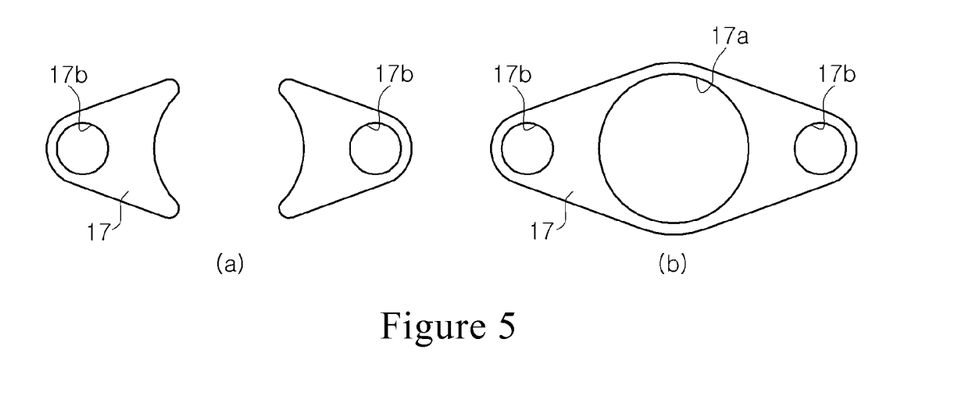
FIG. 5 is a plan view illustrating various examples of metal inserts to be formed integrally with a bracket according to one embodiment.
Figure 6:
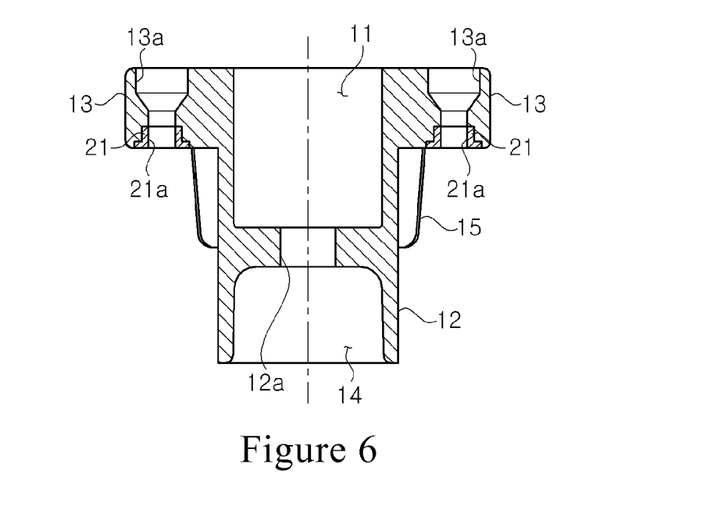
FIG. 6 is a cross-sectional view of a bracket configured to mount a shock absorber according to one embodiment.
Figure 7:
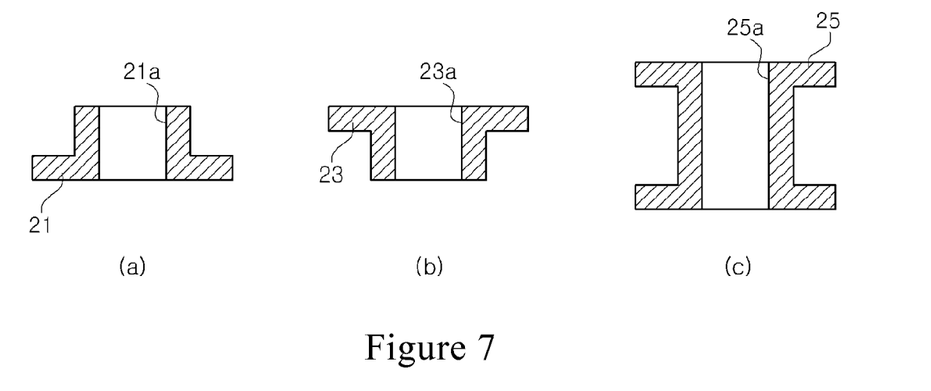
FIG. 7 illustrates side sectional views of various examples of a metal insert to be formed integrally with a bracket according to one embodiment.
Figure 8:
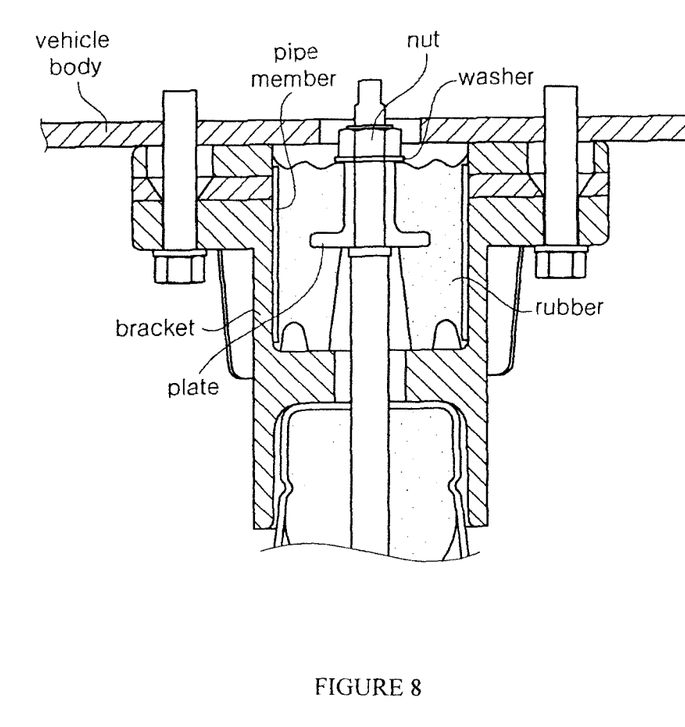
FIG. 8 is a cross-sectional view of a bracket configured to mount a shock absorber according to one embodiment.

FIGS. 2 to 4 and 8 are sectional views of brackets for mounting a shock absorber according to respective embodiments, and FIG. 5 is a plan view illustrating various examples of metal inserts configured to be formed integrally with a bracket according to an embodiment. In addition, FIG. 6 is a sectional view of a bracket for mounting a shock absorber according to another embodiment, and FIG. 7 shows side sectional views illustrating various examples of a metal insert configured to be formed integrally with the bracket according to an embodiment.

A bracket configured to mount a shock absorber according to one embodiment includes a metal insert, for example a steel insert, which is formed integrally therewith and manufactured by an injection molding process using an engineering plastic material. Instead of steel, as a material of the insert employed, various kinds of metals and their alloys may be used if they can enhance the strength of the bracket and have the strength higher than that of engineering plastic.

In one aspect, the bracket for mounting a shock absorber is provided at an outside of the vehicle body, so that the bracket is directly exposed to the external environment. Plastic has a waterproof property. However, if plastic is used in an environment of high temperature and humidity, there is a problem in that plastic having high water absorptivity is deteriorated in wear resistance, strength and the like. If the bracket is used while being exposed to the external environment and required to have the strength of a certain value or more, it is preferable to employ a material having low saturated water absorptivity for the bracket.

According to some embodiments, the plastic material includes a resin having a low saturated water absorptivity, such as PPS, PPA, PA612, PA12 and the like, as the main component. In addition, in order to further enhance the strength of the aforementioned resins, glass fiber can be mixed as a reinforcing material with the resin, the resulting mixture being used for manufacturing the bracket.

According to one embodiment, a material including a resin of 50 to 95 wt % and a reinforcing material of 5 to 50 wt %, and more preferably to employ the material including a resin of 80 to 90 wt % and a reinforcing material of 10 to 20 wt %. The glass fiber acting as a reinforcing material preferably includes staple fibers having a length of 3 to 4 mm and a diameter of approximate 10 μm. Other suitable fibers are possible. In addition to the resin and the reinforcing material, a small quantity of additive, such as lubricant, may be added. If a content of the glass fiber as the reinforcing member is less than 5 wt %, the strength of the bracket can be deteriorated, and if a content of the glass fiber is more than 50 wt %, the wear resistance of the bracket can be deteriorated.

Figure 2:
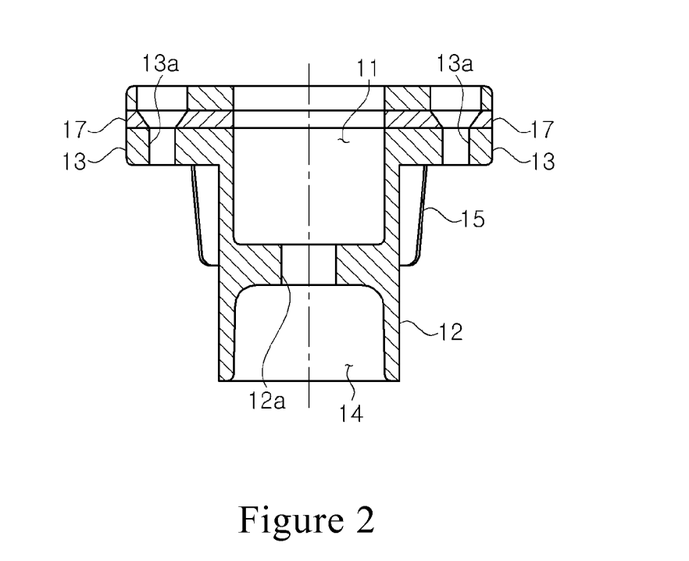
FIG. 2 is a cross-sectional view of a bracket configured to mount a shock absorber according to one embodiment.

As shown in FIG. 2, a bracket according to one embodiment includes a substantially cylindrical body 12 having a recess 11 into which a bush assembly can be inserted, flanges 13 extending from opposite sides of the body 12, a mounting portion 14 formed at a lower side of the body 12 such that a dust cover (not shown) and a bumper stopper (not shown) can be mounted thereon, and a plate-shaped metal insert 17 formed integrally with the bracket.

A bush assembly 120 (see FIG. 1) is press-fitted into the recess 11 of the bracket. The specific configuration of the bush assembly 120 does not limit the present invention, so that a detailed description thereon will be omitted.

The flanges 13 extending from the opposite sides of the body 12 of the bracket are respectively formed with bolt fastening holes 13a, into which bolts (see FIG. 8) are inserted for coupling the bracket to the vehicle body. In addition, a through-hole 12a, through which the piston rod (not shown) can pass, is formed at or toward a central region of the cylindrical recess 11 formed on an upper portion of the body 12 of the bracket.

One or more side reinforcing ribs 15 are formed between the body 12 and each flange 13 of the bracket, thereby enabling the strength of a region between the main body 12 and each flange 13 to be increased.

When the bracket to be secured to the vehicle body through bolts (not shown) is used or assembled, cracks may be generated around the flange to which the bolt is coupled. According to one embodiment, since the plate-shaped metal insert 17 is embedded in the bracket, particularly in the flanges 13, the strength of the bracket can be increased and the durability of the bracket can also be enhanced. Accordingly, even though the bracket is used for a long time or an excessive force is exerted to the bracket during the assembling, it is possible to prevent cracks from being generated around the flange 13 of the bracket.

According to one embodiment, as shown in FIG. 5 (a), metal inserts 17, each of which has a generally triangular shape and is formed with an opening 17b corresponding to the bolt fastening hole 13a, may be placed independently in both flanges 13 of the bracket, respectively. As shown in FIG. 5 (b), alternatively, a single metal insert 17, which has an opening 17a formed at the center thereof corresponding to the recess 11 and side openings 17b respectively formed at both sides thereof corresponding to the bolt fastening holes 13a, and has a generally diamond-shape, or a shape corresponding to a horizontally cross-sectional shape of the bracket, may be placed within the bracket.

Regardless of the shape, the metal insert 17 may be embedded in the bracket so as not to be exposed to the outside. In addition, as shown in FIG. 2, the bracket, as viewed from a side thereof, may be formed such that two plastic portions are attached to upper and lower surfaces of the metal insert 17, respectively, in the shape of a sandwich in order for the metal insert 17 to be exposed.

The thickness of the metal insert 17 may be changed in design according to size, required strength and the like of the bracket. Regarding a vertical location of the metal insert with respect to the flange, in one embodiment, the metal insert 17 may be placed at a vertically central portion of the flange or positioned close to an upper side (e.g., an upper surface) or a lower side (e.g., a lower surface) of the flange.

Like the bracket according to the illustrated embodiment of FIG. 2, the bracket according to the illustrated embodiments of FIGS. 3 and 4 include a metal sheet, particularly a steel insert, formed integrally therewith and manufactured by an injection molding process using an engineering plastic material.

The bracket according to the illustrated embodiment of FIG. 3 is different from the bracket according to the illustrated embodiment of FIG. 2 in that the plate-shaped metal insert 17 is placed on a lower surface of the flange 13 of the bracket and is exposed to the outside, as shown in FIG. 3. In addition, the bracket according to the illustrated embodiment of FIG. 4 is different from the bracket according to the illustrated embodiment of FIG. 2 in that the plate-shaped metal insert 17 is placed on an upper surface of the flange 13 of the bracket and is exposed to the outside, as shown in FIG. 4. Since an example of the structure in which the metal insert 17 is placed within the flange 13 of the bracket has been described, the structure in which the metal insert 17 is exposed to the outside will be discussed below.

Except for a vertical location of the metal insert, the brackets according to the illustrated embodiments of FIGS. 3 and 4 are substantially the same as the bracket according to the illustrated embodiment of FIG. 2, so that like reference numerals are used to designate like members (elements) and the detailed description thereon will be omitted for convenience.

In the bracket according to the illustrated embodiment of FIG. 3, the metal insert 17 is formed integrally with and on a lower surface of the flange 13, and exposed to the outside. Accordingly, the lower surface of the flange 13 to be contacted directly with a bolt (not shown) can advantageously be reinforced by the metal insert 17.

Also, in case of the bracket according to the illustrated embodiment of FIG. 4, the metal insert 17 is formed integrally with the flange on an upper surface thereof and exposed to the outside. Unlike the brackets according to the illustrated embodiments of FIGS. 2 and 3, in which plastic portions are formed on the upper and lower surfaces of the metal insert 17, a molding process can be performed to manufacture the bracket with ease.

The structure in which the metal insert is formed in the bracket as one layer has been described in the above embodiments. According to some embodiments, however, the bracket may be modified such that two or more plate-shaped metal inserts may be formed in one bracket.

That is, one of the metal inserts is formed integrally with the bracket in the mid portion of the flange in a sandwich manner as shown in FIG. 2; and another layer of the metal layers may be formed integrally with the bracket on an upper or lower surface of the flange as shown in FIG. 3 or 4, or two layers of the metal inserts may be formed integrally on upper and lower surfaces of the flange, respectively.

Like the bracket according to the illustrated embodiment of FIG. 2, the bracket for mounting a shock absorber according to the illustrated embodiment of FIG. 6 includes a metal insert, for example a steel insert, formed integrally therewith and manufactured by an injection molding process using an engineering plastic material.

The bracket according to the illustrated embodiment of FIG. 6 is different from the bracket according to the illustrated embodiment of FIG. 2 in that washer-shaped metal inserts 21, 23 and 25 are placed on an upper surface and/or a lower surface of the flange 13 of the bracket to be exposed to the outside, as shown in FIG. 6.

Except for a vertical location of the metal insert, the brackets according to the illustrated embodiment of FIG. 6 is substantially the same as the bracket according to the illustrated embodiment of FIG. 2, so that like reference numerals are used to designate like members (elements) and the detailed description thereon will be omitted for convenience.

In the bracket according to the illustrated embodiment of FIG. 6, the metal inserts 21, 23 and 25 are formed integrally with the flange 13 and exposed to the outside. As shown in FIGS. 7 (a), (b) and (c), the metal inserts 21, 23 and 25 may have various shapes.

The metal insert 21 shown FIG. 7 (a) has a washer-shape and can be placed on the lower surface of the flange 13 of the bracket to be exposed to the outside. The metal insert 23 shown FIG. 7 (b) has a washer-shape and can be placed on the upper surface of the flange 13 of the bracket to be exposed to the outside. Only one of the metal insert types 21 and 23 shown FIGS. 7 (a) and (b) may be used, or both of them may be placed on the upper and lower surfaces of the flange 13. The metal insert 25 shown FIG. 7 (c) has a washer-shape to enable the metal insert to pass through the flange 13 of the bracket and placed on the upper and lower surfaces of the flange to be exposed to the outside.

These metal inserts 21, 23 and 25 each have a generally cylindrical shape and are respectively formed with holes 21a, 23a and 25a (corresponding to the opening 17a of the first to third embodiments) through each of which a bolt (not shown) can pass.

In the meantime, each of the metal inserts 21, 23 and 25 may be formed with a polygonal flange, such as a saw-toothed flange, a triangular flange or a rectangular flange, as well as a circular flange.

As apparent from the above description, according to embodiments of the invention, a bracket for mounting a shock absorber is formed of a plastic material with a metal insert integrally formed therewith for reinforcing the strength of the bracket.

Accordingly, the bracket according to the embodiments enables a reduction in material and machining costs while facilitating manufacture and handling of the bracket. In addition, since the strength of the bolt fastening portion is increased, although the bracket is used for a long time, its durability can be maintained and the assembling efficiency of the bracket can be improved.

Furthermore, since a plastic material having a more enhanced waterproof property than that of a conventional plastic material is used when the bracket is molded, the durability of the bracket exposed to the external environment can be more enhanced.

Although the bracket for mounting a shock absorber according to the present invention so configured has been described with reference to the accompanying drawing, the present invention does not limited to the aforementioned embodiment and the accompanying drawings. It will be apparent that those skilled in the art can make various modifications and changes thereto within the scope of the invention defined by the claims.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A bracket configured to mount a shock absorber, coupling a distal end of a piston rod of the shock absorber to a vehicle body, the bracket comprising:
   a bush assembly;
   a body molded of a plastic material and having a recess formed thereon, the bush assembly being press-fitted into the recess, and a flange extending from the body; and
   a metal insert integrally molded with the body, wherein the metal insert is formed at a central region thereof with an opening corresponding to the recess of the body and is formed at two sides thereof with bolt fastening holes corresponding to bolt fastening holes formed on the flange, the metal insert having a shape substantially corresponding to a horizontally cross-sectional shape of the bracket.

2. The bracket of claim 1 wherein the metal insert is formed within the flange in a sandwiched manner.

3. The bracket of claim 1 wherein the metal insert is formed on at least one of an upper and a lower surface of the flange to be exposed to a surrounding environment.

4. The bracket of claim 1 wherein the body and the flange of the bracket are made of a material including at least one of PPS, PPA, PA612 and PA12 having low saturated water absorptivity for enhancing a waterproof property and a reinforcing material for increasing a strength.

5. The bracket of claim 1, wherein the bush assembly includes a rubber for preventing vibration transmitted through the piston rod from being transmitted to the vehicle body, and a plate embedded in the rubber.

6. The bracket of claim 5, wherein the bush assembly further includes a washer and a nut for coupling an upper end of the piston rod to the plate, and a pipe member attached to an outer periphery of the rubber.

7. A bracket configured to mount a shock absorber, coupling a distal end of a piston rod of the shock absorber to a vehicle body, the bracket comprising:

a bush assembly;

a body molded of a plastic material and having a recess formed thereon, the bush assembly being press-fitted into the recess, and a flange extending from the body; and a metal insert integrally molded with the body, wherein the metal insert has a shape at least partially corresponding to a horizontally cross-sectional shape of the bracket, and wherein the metal insert is formed within the flange in a sandwiched manner.

\* \* \* \* \*